(12) United States Patent
Neuvonen

(10) Patent No.: US 7,205,518 B2
(45) Date of Patent: Apr. 17, 2007

(54) METHOD AND ARRANGEMENT FOR FOCUSING IN AN OPTICAL MEASUREMENT

(75) Inventor: Teppo Neuvonen, Kaarina (FI)

(73) Assignee: Wallac Oy, Turku (FI)

( * ) Notice: Subject to any disclaimer, the term of this patent is extended or adjusted under 35 U.S.C. 154(b) by 201 days.

(21) Appl. No.: 10/912,094

(22) Filed: Aug. 6, 2004

(65) Prior Publication Data

US 2005/0092893 A1 May 5, 2005

(30) Foreign Application Priority Data

Aug. 8, 2003 (FI) ................. 20031143

(51) Int. Cl.
*G02B 27/40* (2006.01)
(52) U.S. Cl. .................. 250/201.2
(58) Field of Classification Search ............. 250/201.2, 250/225; 356/239
See application file for complete search history.

(56) References Cited

U.S. PATENT DOCUMENTS

| | | | |
|---|---|---|---|
| 3,994,586 A * | 11/1976 | Sharkins et al. ............... 356/73 |
| 4,015,127 A * | 3/1977 | Sharkins .................. 250/341.3 |
| 4,079,248 A | 3/1978 | Lehureau et al. |
| 4,450,547 A | 5/1984 | Nakamura et al. |
| 4,627,730 A * | 12/1986 | Jungerman et al. ......... 356/489 |
| 4,672,188 A | 6/1987 | Cohen |
| 4,672,196 A | 6/1987 | Canino |
| 4,684,799 A | 8/1987 | Emoto et al. |
| 4,766,582 A | 8/1988 | Ando |
| 4,984,229 A | 1/1991 | Nedvidek |
| 5,043,570 A * | 8/1991 | Takabayashi ............... 250/216 |
| 5,317,142 A | 5/1994 | Noda et al. |
| 5,412,473 A * | 5/1995 | Rosencwaig et al. ....... 356/451 |
| 5,483,079 A | 1/1996 | Yonezawa |
| 6,177,984 B1 | 1/2001 | Jacques |
| 6,437,856 B1 * | 8/2002 | Jacques ....................... 356/39 |
| 6,444,995 B1 * | 9/2002 | Cho .......................... 250/548 |
| 2002/0085209 A1 * | 7/2002 | Mittleman et al. .......... 356/497 |
| 2003/0002054 A1 * | 1/2003 | Prinzhausen et al. ....... 356/609 |

FOREIGN PATENT DOCUMENTS

| | | |
|---|---|---|
| EP | 0 412 716 | 2/1991 |
| FR | 2 620 537 | 3/1989 |
| FR | 2 750 221 | 12/1997 |
| GB | 710495 | 6/1954 |

* cited by examiner

*Primary Examiner*—Georgia Epps
*Assistant Examiner*—Kevin Wyatt
(74) *Attorney, Agent, or Firm*—Young & Thompson

(57) ABSTRACT

A method and arrangement for focus detection in an optical measuring apparatus. The invention is applicable to focus detection for measuring biological or chemical samples or for compiling an image. The position of a focus for an objective lens in a microscope can be measured more precisely than before. Another aim is to decrease scatter-inflicted interferences in the focusing of samples with a microscope and to reduce reflected light which disturbs focus detection. The aims are accomplished with an inventive solution, in which light reflecting from a measured object is occluded with a mask, positioned essentially in an image plane, and in which, at a suitable distance downstream of the mask, is a detector detecting the space distribution of light. According to a second aspect of the invention, the aims are achieved by a method and arrangement, wherein disturbing reflected light is eliminated by utilizing the polarization of light.

18 Claims, 9 Drawing Sheets

METHOD AND ARRANGEMENT FOR FOCUSING IN AN OPTICAL MEASUREMENT

TECHNICAL FIELD

The invention relates to a method and arrangement for focusing in an optical measuring apparatus, such as a microscope. Most preferably, the invention is applicable to focus detection for measuring biological or chemical samples or producing an image.

PRIOR ART

Optical measuring equipment, such as devices for producing images, have become common in several industries. Such measuring equipment generally requires focus detection, which in this context refers to optical determination and definition for detecting the position of a measuring/image plane. One generally known means of performing focus detection in an imaging apparatus comprises a method of analysing a compiled image, wherein focal information is determined programmatically on the basis of image data and the image has its focus subjected to optical adjustment until the optimal focus is attained. However, a drawback in this method is the slowness of detecting the focus. It is often essential, particularly in chemical measurements, that the measurement be performed as quickly as possible because various properties of samples, such as the strength of emission, may change rapidly.

Another generally known means of implementing a focus detection measurement in an optical instrument comprises a so-called knife edge method, the basic concept of which is described e.g. in patent publication U.S. Pat. No. 4,079,248 [1]. The method is based on a partial occlusion of light reflected from a measured object upstream of a detector placed in the focal plane. Occlusion enables making the symmetry of light incident on the detector dependent upon a spacing of the measured object from the optimal focusing distance. This knife edge method is considerably faster than the above-mentioned image analysing method.

The knife edge method has been successfully applied e.g. in CD reading heads and optical profilometers. Microscopic autofocus systems based on this method are likewise commercially available, but such autofocus systems are typically applicable to the needs of electronics and semi-conductor industry. Regarding the knife edge method, some application-specific improvements have been proposed, based on changes in occlusion geometry. For example, patent publication U.S. Pat. No. 4,672,188 [2] discloses a solution for enlarging a dynamic range and patent publication U.S. Pat. No. 4,684,799 [3] discloses a solution for improving the sensitivity of focus detection. However, the method has kept its basic concept unchanged in applications thus far and will be described next with reference to FIGS. 1–3.

In this context, the term "knife edge" refers to an opaque mask or some other means to enable asymmetrization of the spatial intensity distribution of optical radiation in a plane perpendicular to a light source.

Figure 1:
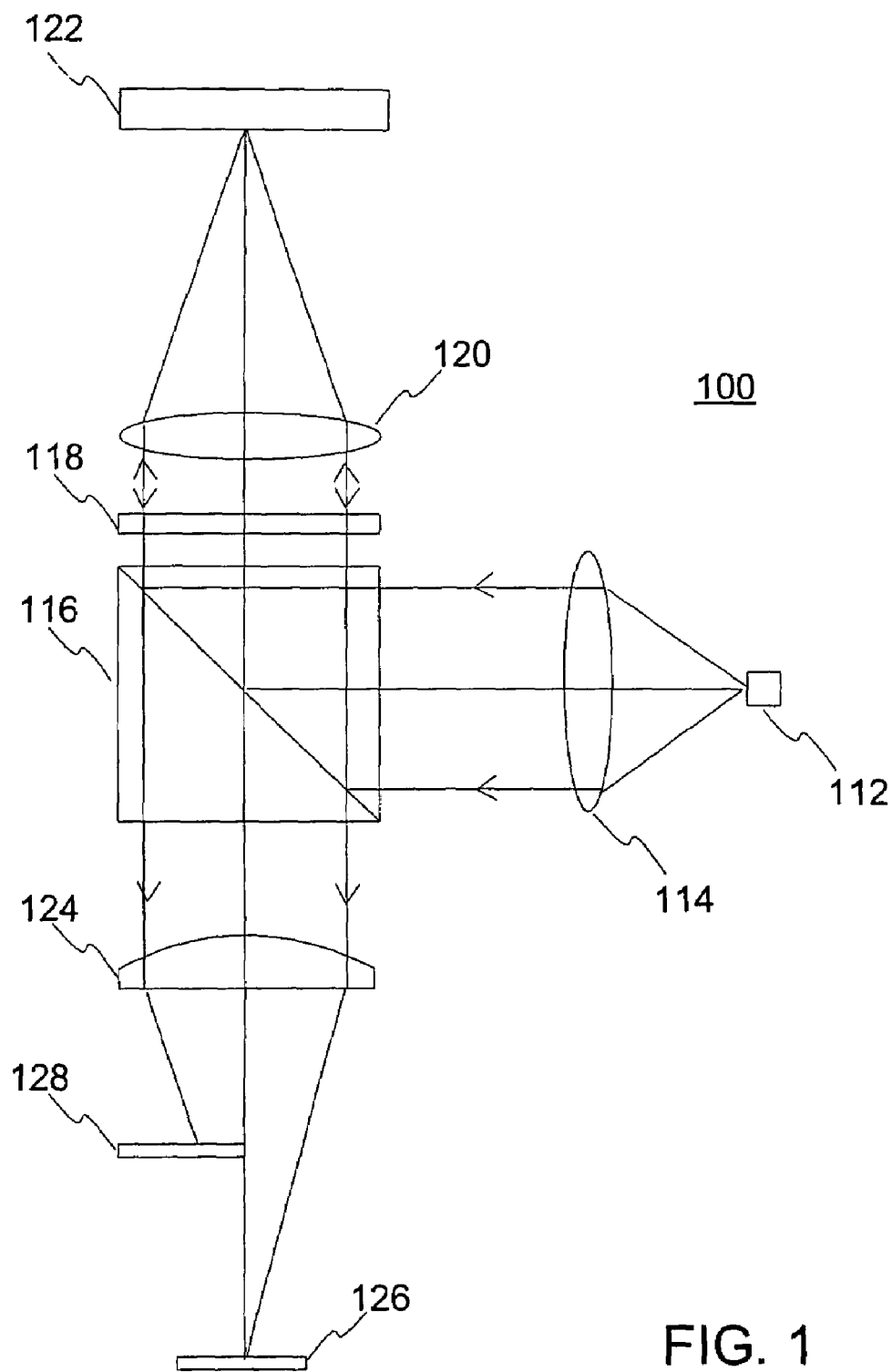

The operating principle of a prior known knife edge method is apparent from FIG. 1, showing an example of one application of the method. In this system, the light of a spot-like light source 112 is collimated by a lens 114 and supplied, as reflected by a polarizing beam splitter 116 and through an objective lens 120, to an object 122 to be measured. Light reflected from the object is collimated at the lens 120. The system further comprises a quarter-wavelength plate 118, whereby light reflected from an object is given a polarization direction such that the light advances through the polarizing beam splitter 116. The light beam reflected from an object is focused by means of a lens 124 at a two-component photodiode 126. Another essential component of the system is a mask 128, placed downstream of the lens 124 and used for occluding a portion of the light beam as shown in the figure.

The detector 126 is positioned on the focal line of the lens 124 and thus, provided that the objective lens is in focus relative to an object to be measured, the detector plane develops an image of the light source reflected from the object to be measured. When the objective lens is in focus, the image developed in the detector plane is symmetrical relative to an optical axis as the mask 128 is located in a so-called aperture plane far away from the focal point of the lens 124. Thus, in this condition shown in FIG. 1, both detector channels are supplied with the same signal.

Figure 2A:
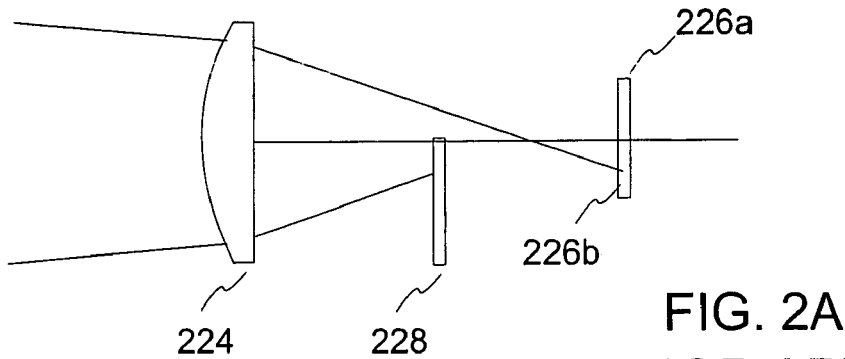
Figure 2B:
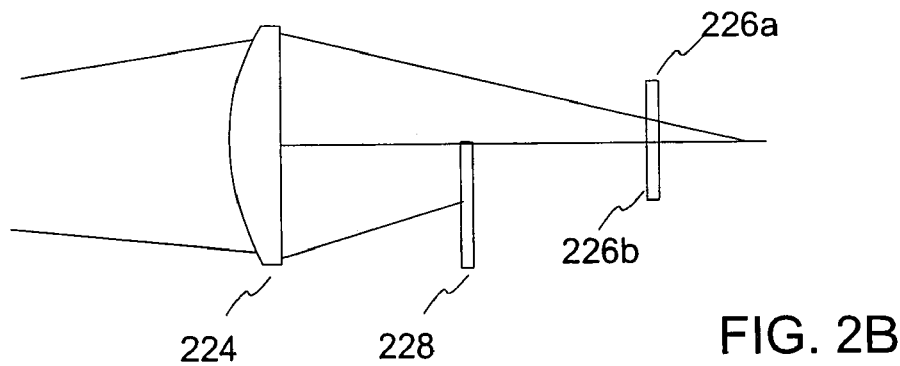
Figure 3:
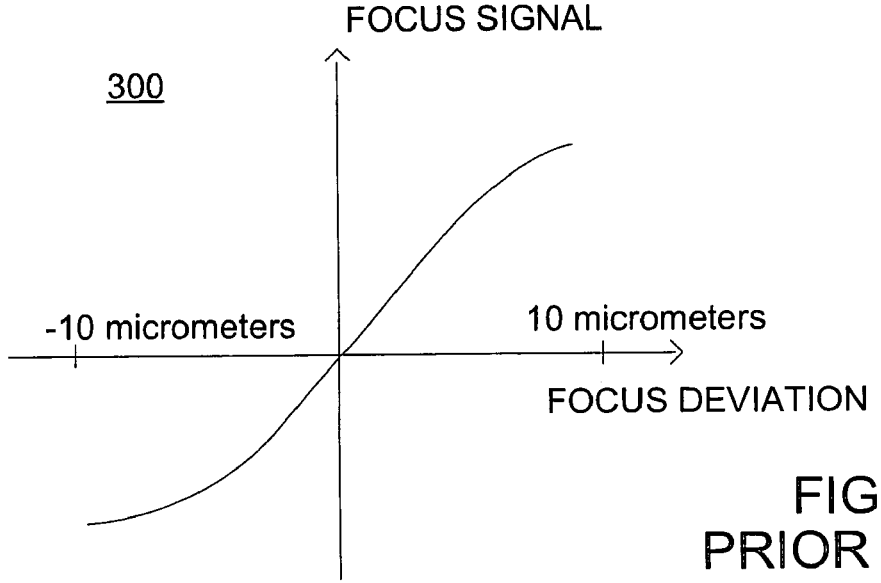

FIGS. 2A and 2B depict conditions, in which the objective lens is not in alignment with the focal point. In FIG. 2A, the image plane develops between a detector plane and an objective lens. Thus, a detector 226b is hit by a larger quantity of light intensity than a detector 226a. Respectively, FIG. 2B shows a condition, in which the image plane develops behind a detector plane. Thus, the detector 226a is hit by a larger quantity of light intensity than the detector 226b. Thus, with a detector moving away from the focal line in response to a mask, the detector surface develops an asymmetrical intensity distribution. The direction of a focus deviation is known as one channel receives more light than the other channel, depending on which side of the focal line the image plane is located. FIG. 3 shows, as a function of focus deviation, the difference between signals received from two detectors. It reveals that the quantity of difference between the signals is indicative of the quantity of focus deviation.

The prior known knife edge method involves some drawbacks and shortcomings. The above discussion relates to measurements, in which the measured object comprises a highly reflective and opaque flat surface. In many applications, however, the object to be measured does not live up to these requirements, one example thereof being a measurement of chemical samples contained in a sample vessel. In such a measurement, light travels through a translucent sample vessel to a sample, the light reflecting from a junction between the sample vessel and air, from a junction between the sample vessel and the sample, and possibly also from particles, such as biological cells, present in the sample. In a traditional knife edge method, the separation of reflections delivered by various surfaces from a signal is not linear, since the signal plane is subjected to a continuous non-linear change as a function of the location of an objective lens. Because, in addition to the above-discussed non-linear change, the signal also experiences disturbance as a result of scatter, the detection of junction-related information from the signal is difficult and therefore the focus defining system may function unreliably. Moreover, since the traditional method involves placing a detector in the image plane, all various junction reflections must reflect onto the same spot at the mid-point of the detectors for a successful identification of the junctions. For example, in the process of imaging through the bottom of a microtiter plate, the plate should be in an absolutely straight position in order to manage imaging the various junction reflections simultaneously at the same spot.

Another problem concerns the fact that especially biological samples do not reflect light in a uniform fashion as the sample contains e.g. cells or other particles. Thus, the detector surface develops an image of the sample structure and, depending on the structure of a given sample, the intensity of light incident on the detector at a given time may fluctuate a great deal in the process of adjusting the focus.

DESCRIPTION OF THE INVENTION

It is an aim of the invention to provide a method and arrangement for focusing detection in an optical measuring apparatus, which are capable of avoiding or mitigating drawbacks associated with the prior art. A particular aim is to provide a solution, which enables measuring the position of a focus in an optical measuring apparatus more accurately than before, especially in measuring situations involving several reflections received from an object to be measured. Another aim of the inventive method and arrangement is to mitigate scatter-inflicted disturbances in the process of focusing samples with a microscope.

One of the aims of the invention is also to facilitate detection of refractive index junctions from the focal point of microscopic samples. Other aims of the invention include also simplifying the detection of a focusing signal and attaining an improved efficiency in the vicinity of a focal range for the light to be detected.

It is also an object of the invention to improve the performance of a focus detector used in an automatic focusing system in such an optical arrangement, wherein microscope optics is applied for imaging objects, such as e.g. cells or microparticles, present on the bottom of a pit in a microtiter plate.

The aims are achieved by an inventive solution, in which a mask, occluding light reflected from a measured object, is located essentially in an image plane and a light-sensing detector lies behind the image plane at a suitable distance from the mask. The aims are also accomplished by a solution according to a second aspect of the invention, relating to elimination of disturbing reflected light by making use of the polarization of light.

One inventive embodiment comprises positioning a knife edge in the image plane, and downstream of the edge, at a suitable distance therefrom, is a detector in the form of a 2-element photodiode, and the light source comprises a laser with line forming optics. Another inventive embodiment comprises eliminating direct reflection of a linearly polarized focusing beam from the bottom of a microtiter plate by means of a criss-cross polarization filter, thus facilitating the detection of a reflection coming from the internal surface of a sample.

Methods and arrangements of the invention are particularly suitable for microscopic focusing of biological samples, such as cells, and chemical and biochemical samples. The invention can be easily applied, for example, for focusing the objective lens of a microscope at a cell sample through a translucent sample vessel, such as the bottom of a microtiter plate.

The invention offers numerous benefits over traditional focus detection methods. Light scatter from a sample does not cause major disturbances in signals obtained from detectors and, thus, the focusing accuracy is not degraded by scattering. Because, in this novel method, a detector is no longer placed in the image plane, the light incident on the detector is heterodyned from various parts of a sample, the formations present in the sample therefore not interfering with the detection of a focus signal. Hence, by virtue of this novel solution, for example the focusing of cell samples is easier.

By virtue of the invention, the detection of various refractive index junctions is also easier, since the detector signals provide an easy way of determining when a change in the refractive index difference occurs at the focal point.

The invention also enables a signal detection in a manner simpler than before. Measuring will be easier as light detectors are not located at the focal point of a detector lens, which is the case in a traditional knife edge method.

In the invention, the pair of detectors need not necessarily be so close to each other and the average distribution of light energy on a detector surface is more uniform than in traditional methods.

Since the traditional knife edge method comprises occluding typically 60–95% of light in the aperture plane, the light intensity being detected is low with respect to the intensity of a light source. Thus, the present invention provides for a higher detection efficiency in the vicinity of a focal range. The invention likewise provides for elimination of a disturbing light reflection more efficiently than prior art focus detection methods.

The measurement of a focus position can be based on the utilization of a light source used in actual measurement, but preferably a separate light source can be used for focus detection. Such a system comprises directing a separate light beam, e.g. a laser beam, to an object to be imaged and detecting the light reflected from the object. This optical arrangement, a light source—reflection—detection, is designed in such a way that the light being detected contains information about the distance between an objective lens and an object to be imaged, whereby this spatial information can also be used as a basis for performing the focusing of actual measuring optics. The invention is also applicable to those systems, in which the light beam used in determining the position of a focus is directed to an object through an objective lens, as well as to those in which the light beam advances to an object outside imaging optics.

An arrangement of the invention for focus detection in an optical measuring apparatus, said arrangement comprising an objective lens for developing an image plane for an object to be measured, a detector for measuring light received from the object, and a mask interposed between the objective lens and the detector for making the space distribution of light received by the detector's surface dependent on a focus position, is characterized in that said mask is located essentially in a plane, in which the image plane is adapted to develop when the measuring apparatus is in focus, whereby said detector is located behind said image plane and the mask.

An arrangement of the invention for mitigating the effect of surface reflection in measuring the position of a focus in an optical measuring apparatus, wherein a measured object comprises a sample present in a sample vessel and, for measuring the position of a focus, the measuring apparatus comprises:

a light source for applying a light beam to an object to be measured and a detector for measuring light reflected from the measured object, whereby at least a portion of the light beam to be measured has reflected from a junction between the sample and a sample vessel wall, as well as a portion has possibly reflected from a junction between the wall and air, is characterized in that said arrangement comprises at least one polarization filter for filtering said light beam, and said sample vessel wall consists of a material, in which the polarization state of a light beam changes as the light beam advances through said wall, the polarization filter having its polarization direction selected in view of applying more suppression to the portion of a measured light beam reflected from the wall/air junction than to the portion reflected from the sample/wall junction.

A method of the invention for detecting the focus of an objective lens in an optical measuring apparatus, said method comprising the following steps of:

supplying a light beam to an object to be measured, using an objective lens to develop an image plane of the object to be measured, occluding reflected light for making the space distribution dependent on a focus position, measuring the spatial distribution of the intensity of light reflected from the object, is characterized in that said occlusion is effected in a plane substantially perpendicular to the light beam, in which the image plane produced by the objective lens is adapted to develop when the measuring apparatus is in focus, the measurement of the space distribution of light intensity being performed from behind the image plane.

A method of the invention for decreasing adverse surface reflection in a measurement for the position of a focus in an optical measuring apparatus, the measurement comprising the following steps of:

supplying a light beam through a sample vessel wall to a junction between a sample and the wall, measuring a reflected light beam, at least a portion of the light beam to be measured having reflected from the junction between the sample and the wall, as well as a portion having possibly reflected from a junction between the wall and air, is characterized in that said light beam is filtered with at least one polarization filter before and/or after the reflection of the light beam to be measured and the light beam has its polarization state changed as the light beam travels through said wall, the polarization filter having its polarization direction selected in view of applying more suppression to the portion of a measured light beam reflected from the wall/air junction than to the portion reflected from the sample/wall junction.

A few preferred embodiments of the invention are also defined in the dependent claims.

The concepts "upstream", "behind", and "between" are used in this specification in reference to the position with respect to the propagating direction of light, such that at the location "upstream" the light beam arrives first and at the location "behind" it arrives later.

LIST OF DRAWINGS

Figure 4:
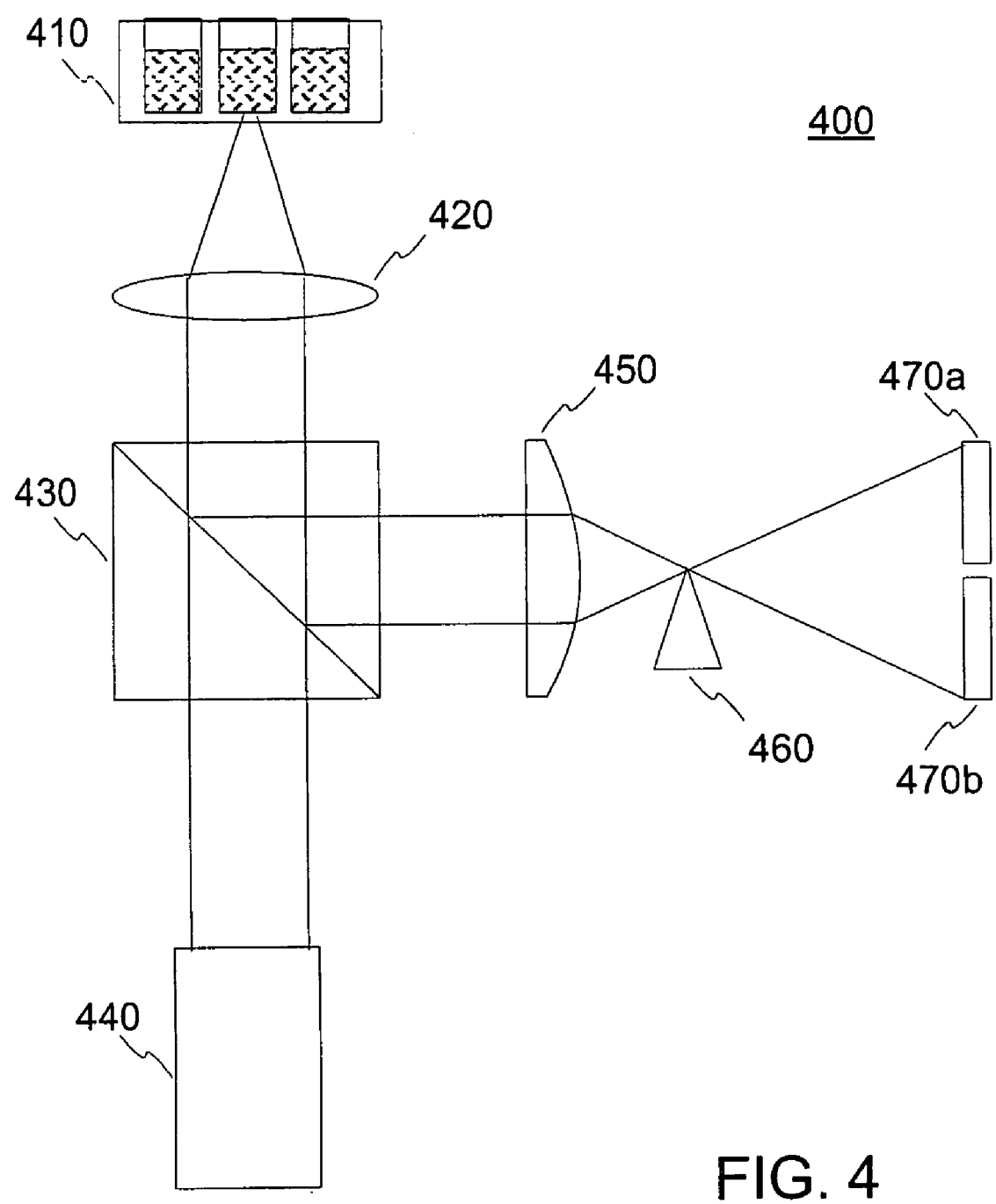
Figure 5A:
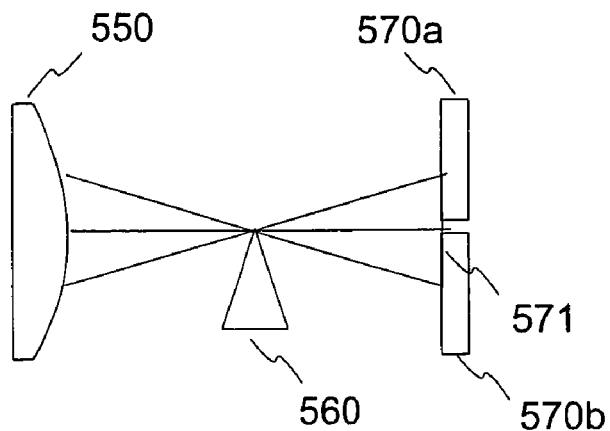
Figure 5B:
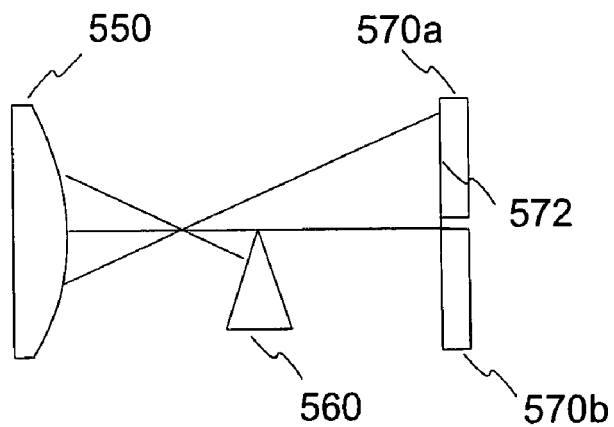
Figure 5C:
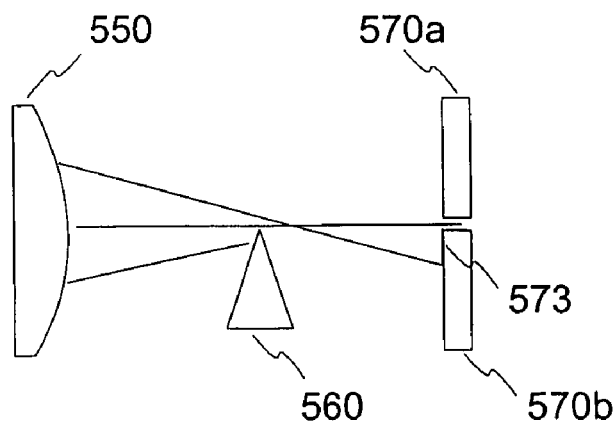
Figure 6A:
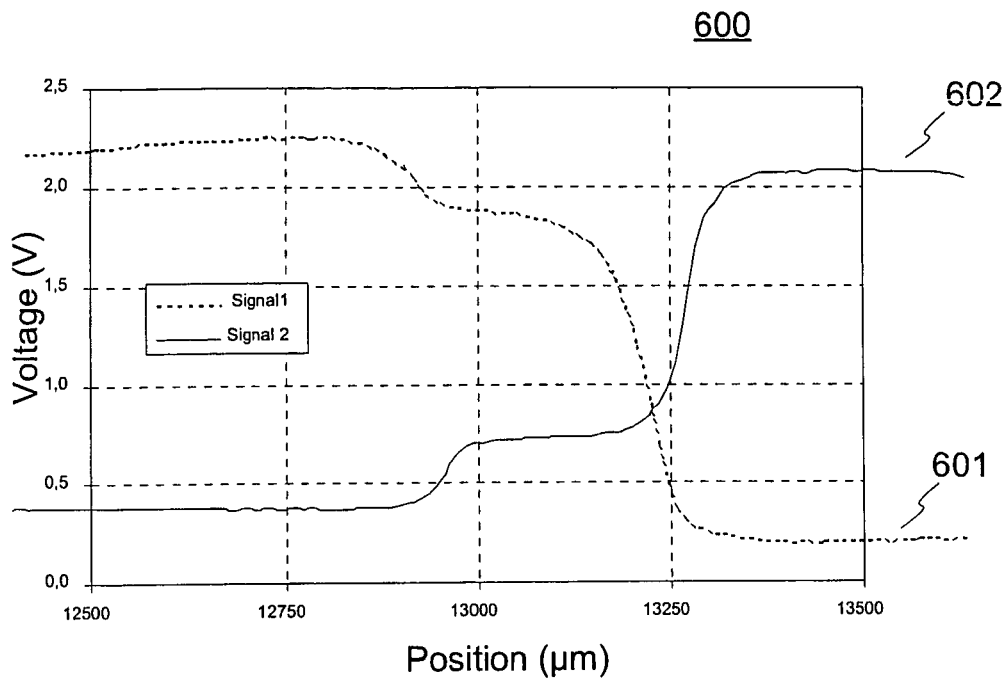
Figure 6B:
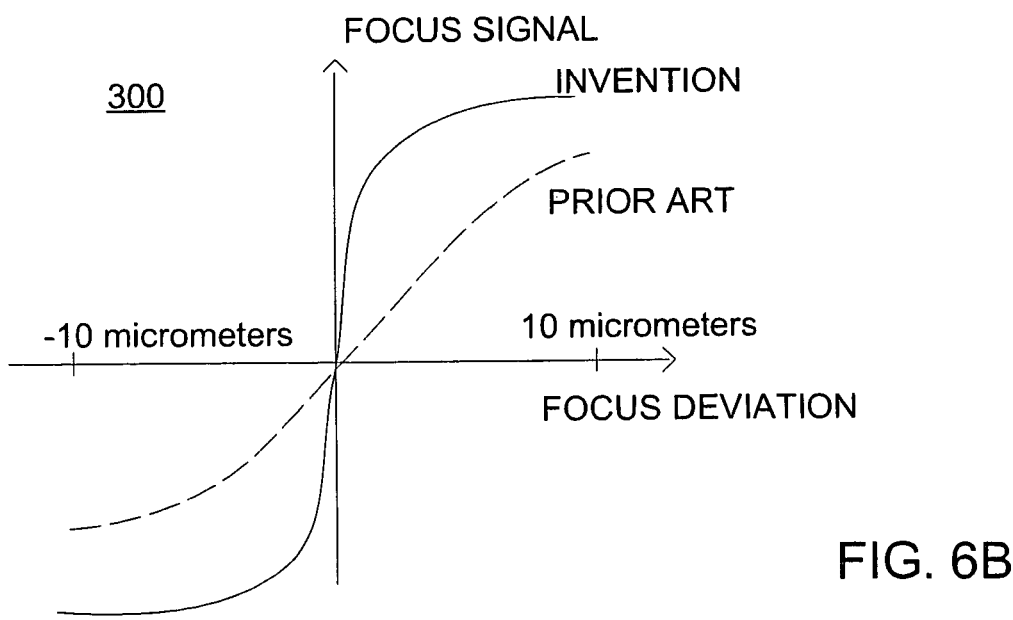
Figure 7:
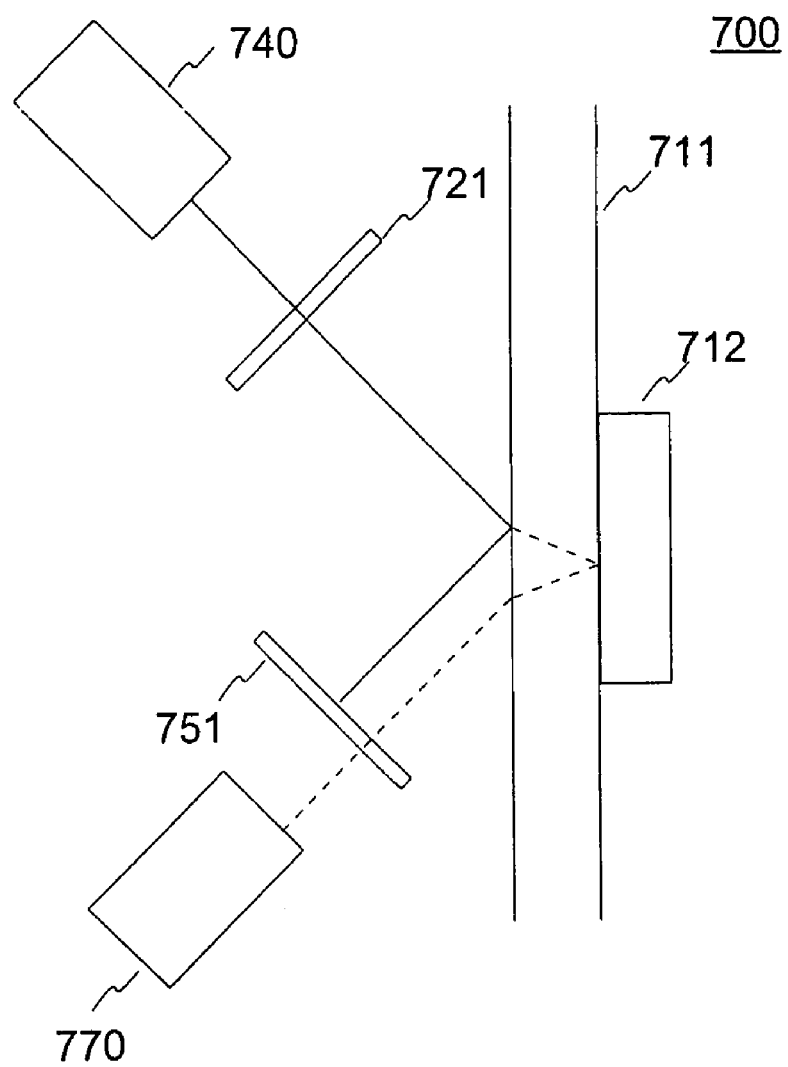
Figure 8A:
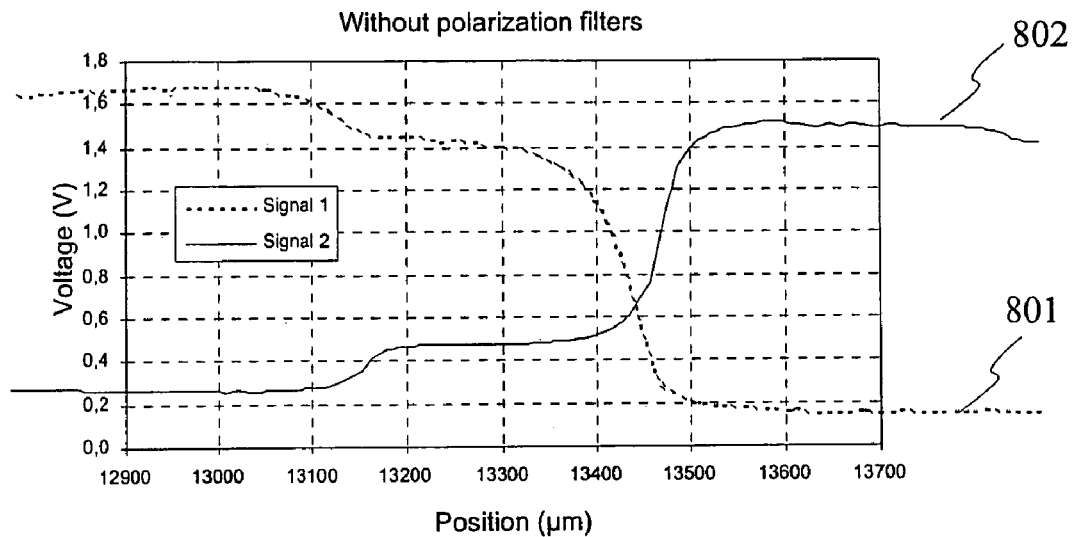
Figure 8B:
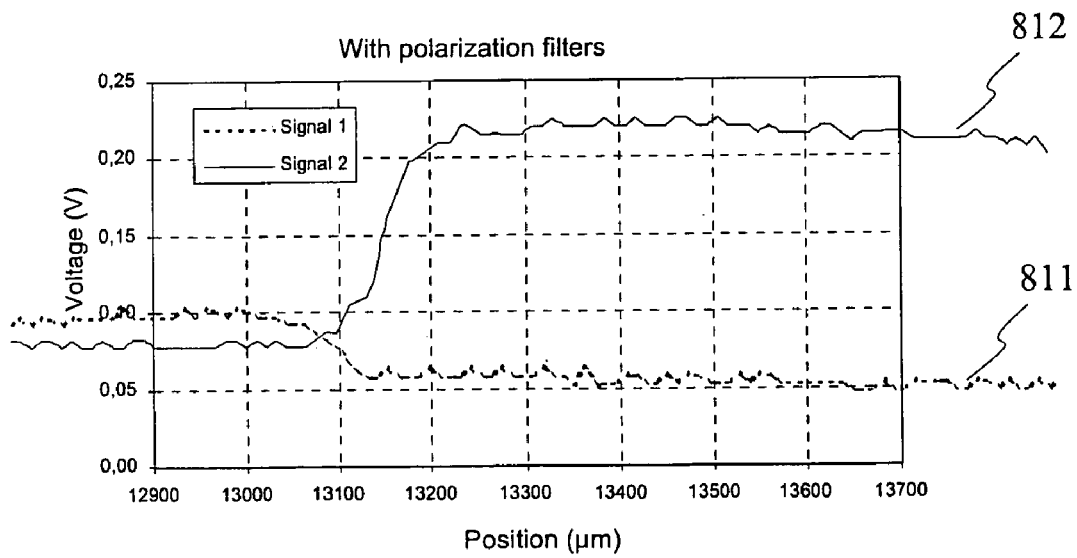
Figure 9:
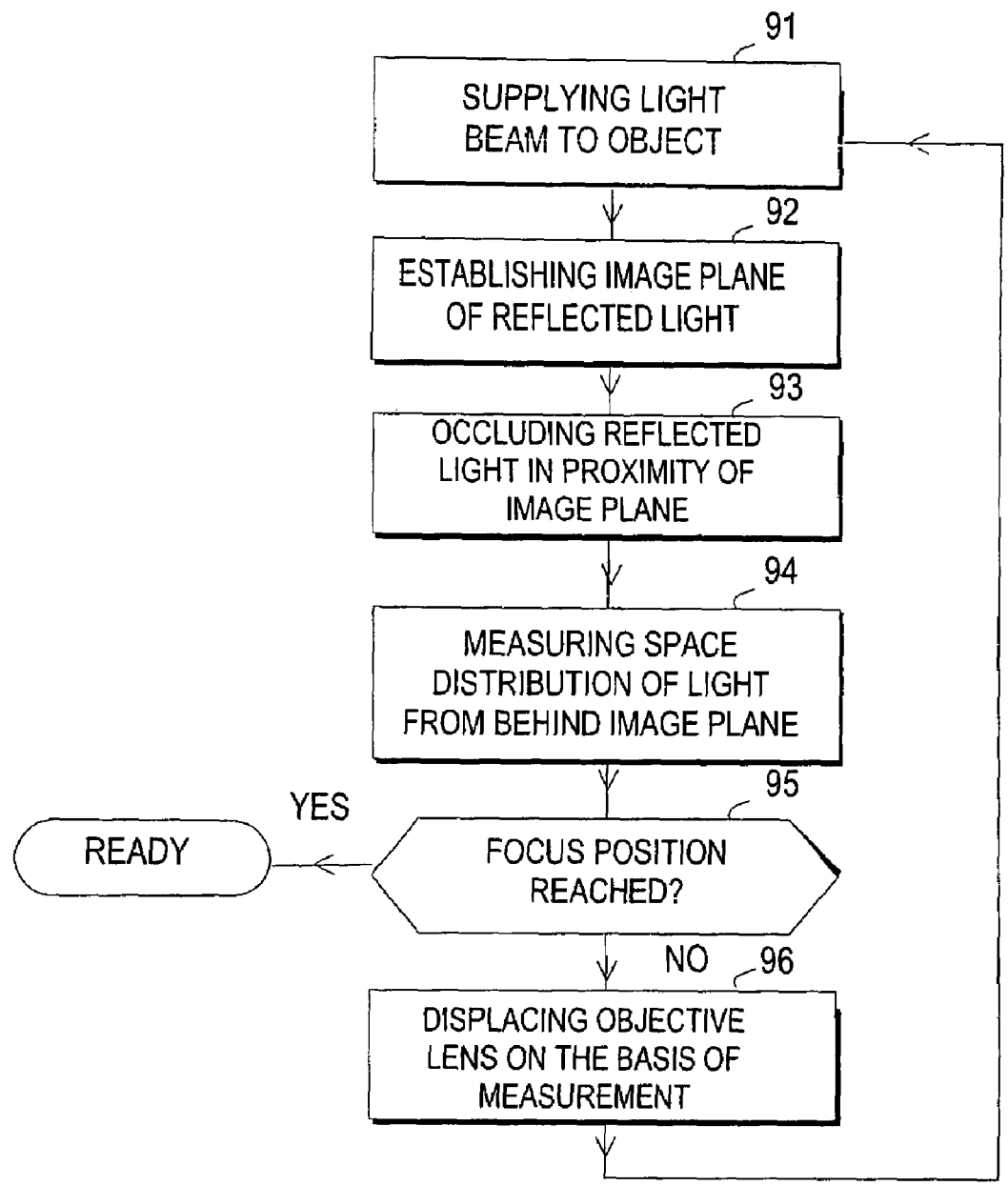
Figure 10:
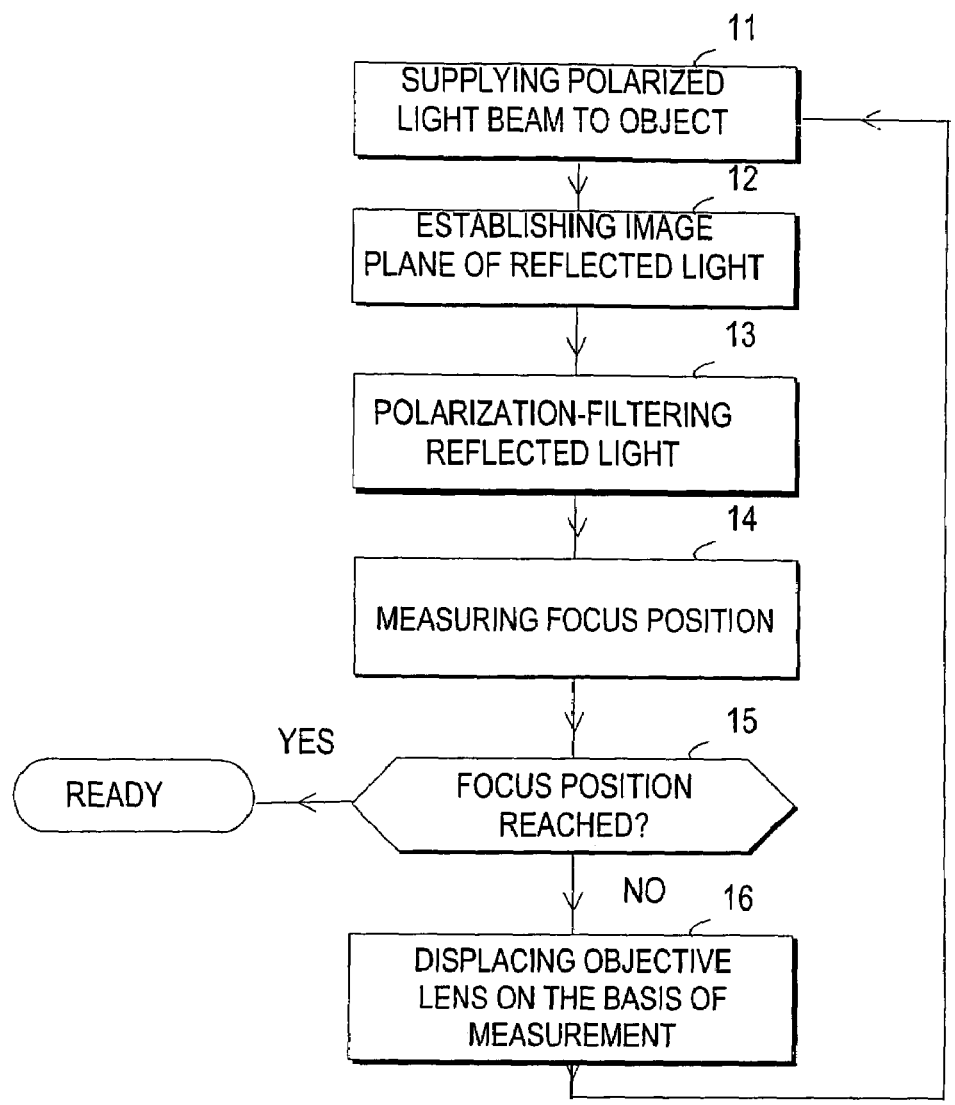

The invention will now be described in more detail with reference to the accompanying exemplary embodiments and drawings, in which:

FIG. 1 shows a knife edge method of the prior art for focus detection,

FIG. 2A shows the development of an asymmetrical intensity distribution effected by a prior art knife edge method in a condition, in which the image plane lies upstream of a detector plane, FIG. 2B shows the development of an asymmetrical intensity distribution effected by a prior art knife edge method in a condition, in which the image plane lies behind a detector plane, FIG. 3 shows a focus signal as a function of focus deviation in a knife edge method of the prior art, FIG. 4 shows one arrangement of the invention for detecting a focus position, FIG. 5A shows the development of an intensity distribution in an arrangement of the invention in a focus condition, in which the image plane is in line with a mask, FIG. 5B shows the development of an asymmetrical intensity distribution in an arrangement of the invention, in which the image plane lies upstream of a mask, FIG. 5C shows the development of an asymmetrical intensity distribution in an arrangement of the invention, in which the image plane lies behind a mask, FIG. 6A shows focusing signals to be received from two detectors in one arrangement of the invention in the process of measuring a sample through the bottom of a plastic microtiter plate, FIG. 6B shows a difference signal in one arrangement of the invention in comparison to a difference signal of the prior art, FIG. 7 shows an arrangement of the invention for reducing front surface reflection, FIG. 8A shows a measurement of focus position without polarization filters, FIG. 8B shows a measurement of focus position according to the invention with polarization filters, FIG. 9 is a flow chart, showing one method of the invention for detecting a focus position, and FIG. 10 is a flow chart for one method of the invention for reducing front surface reflection.

MORE DETAILED DESCRIPTION OF THE INVENTION

FIGS. 1–3 were described above in reference to the prior art.

FIG. 4 shows one arrangement 400 of the invention for detecting the position of a focus. Light beams coming from a light source 440 are delivered through a partially translucent mirror 430 and an objective lens 420 to an object 410 to be measured, which in this case comprises a chemical sample present in a sample vessel. Light beams reflected from the object are delivered to the partially translucent mirror 430 to reflect therefrom by way of a detector lens 450 to detectors 470a, 470b and to a mask 460. The mask comprises a knife edge mask 460 positioned at the focal point of the detector lens 450, which also constitutes an image plane when the objective lens is in focus. At a suitable distance downstream of the image plane and the mask is the detector 470a, 470b constituted by a 2-element photodiode, APD (Avalanche Photodiode), or some other light detector.

In some embodiments, the light source 440 comprises a coherent light source or laser, provided with line forming optics. The use of a line laser is preferred in the case of a rectangular detection surface. The light source 440 may also be established by ordinary light or several mono- or multichromatic light sources. The components 410, 420, 430, 440, 450, 460, 470 are disposed in FIG. 4 in such a way that the knife edge 460 is positioned at the focal point of the detector lens 450 and the detector 470 lies downstream of the knife edge 460 at such a distance that the field of light has an optimal coverage relative to the detectors 470a, 470b. The knife edge 460 has its height preferably adjusted in such a way that, when the objective lens 420 is in focus, the entire line pattern is just barely visible on the detector 470a, 470b. Naturally, the components 410, 420, 430, 440, 450, 460, 470a, 470b can be disposed in a wide variety of configurations according to the invention.

FIG. 5A illustrates in more detail the propagation of light to a detector in the arrangement of FIG. 4. As depicted in FIG. 5A, the light beams narrowly by-pass the edge of a mask 560 and split for the surfaces of two detectors 570a, 570b, such that the intensity of light 571 is equal on the surfaces of both detectors.

FIG. 5B illustrates the propagation of light when the image plane develops between a mask and a detector lens, the measuring optics being out of focus. Hence, the mask 560 eliminates some of the light beams and most light beams 572, having by-passed the mask, will be received by the detector 570a.

FIG. 5C illustrates the propagation of light when the image plane develops between a mask and a detector, the measuring optics being again out of focus. Thus, some of the light beams are again eliminated by the mask 560 and most light beams 573, having by-passed the mask, will be received by the detector 570b.

FIG. 6A shows a typical measuring result, wherein focusing signals have been measured through the bottom of a plastic microtiter plate, the sample comprising cells in a water-based solution, settled on the bottom of a pit. It is evident from FIG. 5 that, since the refractive index difference at a plastic-water junction (~12900 µm) is smaller than at an air-plastic junction (~13250 µm), the change perceivable in signals will also be smaller. Consequently, a change in the refractive index difference occurring at the focal point is readily perceivable from the signals.

FIG. 6B shows a graph for the difference between signals of two detectors as a function of focus deviation both in an arrangement of the invention and in a knife edge method of the prior art. It is evident from the figure that the function of the inventive method is more strongly asymptotic in the proximity of focus. In practice, this indicates that the focus position can be detected with a considerably higher accuracy in the present invention than in the prior art knife edge method.

FIG. 7 illustrates one arrangement 700 of the invention for reducing front surface reflection by utilizing the polarization of light. One inventive embodiment can be implemented by placing a linear-polarization effecting polarization filter 721 between a focus-detection light source 740 and a sample vessel 711, a sample 712 to be measured lying behind the sample vessel wall 711. Instead of linearly polarized light, the invention can also be practised with circularly polarized light, if desirable.

When using an appropriate laser as the light source 740, the individual polarization filter 721 is not absolutely necessary if the laser has its output polarized with sufficient linearity. When using other light sources, the polarization filter 721 is typically required. The arrangement of FIG. 7 respectively comprises a second polarization filter 751, positioned between the sample 712 and a detector 770. The second polarization filter has its polarization axis preferably perpendicular to the direction of the first polarization filter. With a linearly polarized focus-detection beam reflecting from an air-plastic junction, there is no change in the polarization state of light and, hence, this reflection does not penetrate through the polarization filter 751 upstream of the detector. On the other hand, a light beam, which does not reflect until from a plastic-water junction, advances in the sample vessel wall, e.g. within a double-refracting material, resulting in a change in the polarization state of light. A further result of this is that a portion of the light penetrates through the polarization filter 751 end ends up in the detector 770. Thus, the present inventive arrangement can be used, if desired, for nearly totally suppressing a reflection coming from the first junction, the detector 770 being only reached by a reflection beneficial in terms of focus detection.

Said change in the state of polarization may refer e.g. to partial or full depolarization, rotation of the polarization axis, or circular polarization. Said double refractibility may be based e.g. on the stress state of a plastic material or deformation undergone by the material, on the structure of a material consisting of polymers (e.g. fibers) or on the natural double refractibility of a crystalline material. In addition to double refractibility, a change in the polarization state of light occurring in a material may also result e.g. from scatter.

In some measurements it is also desirable to obtain information regarding the position of a first junction. In this case, it is possible to employ partial suppression of a light beam reflecting from the air junction, such that the polarization filters 721, 751 are not placed in a fully crosswise position. Thus, the invention can be used for balancing relationships between the strengths of reflection signals as desired. However, a condition for the arrangement's functionality is that the focus detection be effected through such a material which changes the polarization state of polarized light.

FIG. 7 does not illustrate all of the optical components needed in the process of determining a focus position; which for one arrangement are shown in FIG. 4.

The invention can be primarily utilized in such systems, wherein the measurement of a focus position is based on the reflection of an individual light beam from a surface to be focused. In such a system, a light beam (e.g. a laser beam) is directed to an object to be imaged, followed by the detection of light reflected from the object. This optical arrangement, a light source—reflection—detection, is designed in such a way that the light being detected contains information regarding the distance between an objective lens and an object to be imaged, whereby this spatial information can be used as a basis for performing focus detection also in optics associated with actual measuring. The invention is applicable both to such systems, wherein a light beam used in the determination of focus position is directed to an object through an objective lens, and to those in which a light beam advances outside imaging optics.

It should also be noted that the reflection of a light beam depends on the beam's polarization direction and, thus, the polarization filtering of a light beam occurring in reflection can also be utilized in the process of implementing an arrangement of the invention. Hence, it is preferred that the incidence of light on the surface of an object be effected at an inclined angle for bringing about polarization filtering. Thus, for example an arrangement can be employed, wherein linearly polarized laser light is supplied to a sample plate at a Brewster angle, whereby it is possible to achieve a status in which the front surface reflection, or e.g. an air-plastic junction reflection, is totally suppressed. Hence, the elimination of front surface reflection through the use of polarization effect is feasible without a single separate polarization filter, provided that the light source delivers polarized light. Respectively, if the light source delivers non-polarized light, it is possible to search a correct angle of reflection for a status in which the light reflected from the front surface is almost completely linearly polarized. In this case, all that is needed for the elimination of adverse reflection is a single separate polarization filter upstream of the detector. In these arrangements, the reflection surface indeed functions at the same time as one of the polarization filters. Nevertheless, the arrangement requires at least two factors relating to the polarization of light, such options being specified in the following table:

| Light source | Reflection | Detection |
|---|---|---|
| Polarized light | Normal | Polarization selective |
| Polarized light | Polarization selective | Normal |
| Non-polarized light | Polarization selective | Polarization selective |
| Polarized light | Polarization selective | Polarization selective |

In this table, the term "polarized light" refers either to polarization-filtered light or laser light, which in itself is polarized. "Polarization selective reflection" refers to reflection of light, wherein the incident beam has a polarization state different from that of the reflected beam. "Normal reflection" in this context refers to non-polarization selective reflection. "Polarization selective detection" refers to an incident, in which a signal detected by the detector depends not only upon the intensity of light but also upon its polarization state. This can be implemented e.g. by placing a polarization filter in front of the detector. "Normal detection" in this context refers to non-polarization selective detection.

The inventive arrangement can also be used in solutions, wherein focus detection is based on image analysis. Even in this case, the use of inventive polarization filtering enables avoiding adverse extra reflections.

FIGS. 8A and 8B visualise by way of example two measurements of a focus position, wherein a measurement 800 of FIG. 8B is effected as described above by using polarization filters and a measurement 810 of FIG. 8A is performed without polarization filters. The measurement of focus detection signals is effected from a microtiter plate, which has a translucent plastic bottom and water in its sample pit. Focus detection signals 801 and 802 in FIG. 8A reveal both a change (~13450 µm) caused by a first (air-plastic) junction reflection and a change (~13150 µm) caused by a second (plastic-water) junction. When the measurement is performed with polarization filters, a corresponding change is no longer inflicted in signals 811 and 812 by the first junction reflection, as shown in FIG. 8B. Thus, it can be demonstrated even experimentally that the above-described measuring arrangement is capable of achieving an almost total elimination of the first reflection, if this is desirable.

FIG. 9 shows a flow chart for one method of the invention for determining a focus position. A first step 91 comprises supplying a light beam to an object. According to the invention, the light may consist of laser light, ordinary light containing several wavelengths, or monochromatic light. A step 920 comprises focusing the light at an image plane. According to the invention, the light can be guided by means of mirrors, partially translucent mirrors, and lenses in order to provide an image plane. In a step 93, the light beams by-pass a mask, which, in accordance with the invention, lies essentially in a plane that constitutes said image plane when the focus is reached. The mask is typically a mask of the knife edge type and the beams typically pass close thereby when the arrangement is in a focus condition, and some of the light beams are occluded by the mask when the arrangement is not in a focus condition. A step 94 comprises measuring the space distribution of light beams by means of a detector downstream of the mask. The detector can be a multi-element photodiode or some other type of light detector. The measuring result is surveyed next in a step 95. If the space distribution indicates that the arrangement is not in a focus condition, an objective lens included e.g. in an optical arrangement is displaced in a step 96 on the basis of a measuring result concerning the space distribution of light. This is followed by repeating steps 91–95 as many times as required for reaching a focus position.

FIG. 10 shows a flow chart for one method of the invention for mitigating the effect of an adverse front surface reflection in measuring a focus position. In a step 11, a polarized light beam is applied to an object to be measured. The light may consist of polarization-filtered light, but it is also feasible to produce the light with a polarized-light emitting laser. A step 12 comprises establishing an image plane of reflected light with optical arrangements. The light reflected from an object is filtered with a polarization filter in a step 13, followed by a step 14 which comprises measuring a focus position, preferably based on where the image plane establishes itself. This can be effected e.g. by means of a knife edge method of the invention. The measuring result is next surveyed in a step 15. If the space distribution indicates that the arrangement is not in a focus position or condition, an objective lens included e.g. in an optical arrangement is displaced in a step 16 on the basis of a measuring result concerning the space distribution of light. This is followed by repeating steps 11–15 as many times as required for reaching a focus position.

In step 13, at least some of the light reflected from a sample junction is passed through. The polarization state of this light has typically changed over its path, e.g. when penetrating through the bottom of a sample vessel. On the other hand, the light reflected from a front surface, such as the air junction of a sample vessel, is filtered entirely or partially away in step 13. This separation of light beams reflected from various parts is accomplished by setting the polarization directions as described in reference to FIG. 7. Said polarization-filtering can also be effected in reflection itself.

As revealed by the foregoing, the invention is able to provide considerable benefits. In the inventive arrangement, the scattering of light from an object does not cause major interferences in a signal. The invention also facilitates locating junctions with various refractive indices. In addition, the invention also enables simpler detection of a focus detection signal. The invention is also capable of providing a higher efficiency in terms of detecting a focus position. The invention further enables elimination of a disturbing light reflection more efficiently than focus detection methods of the prior art.

The invention has been described above in reference to specified embodiments. An embodiment, which lies within the inventive arrangement and method or within the inventive concept, can be implemented by a person skilled in the art of optics and microscopy. However, it is evident that the invention is not limited to the discussed embodiments, but encompasses all embodiments within the scope of the inventive concept and appended claims.

It should additionally be appreciated that the invention is not limited to the use of visible light, but the term "light" is used in this context not only in reference to visible light but also to other possible wavelengths, such as e.g. infrared radiation. It should also be noted that the concept "optical measuring apparatus" must be conceived in a broad sense and specifically it covers also equipment intended for visualisation. It is also worth noticing that, in order to adjust a focus position, it is possible, together with or in addition to adjusting the position of an objective lens, to displace a measured object or to adjust the position of some other component or the distance between components in an optical arrangement.

REFERENCES

U.S. Pat. No. 4,079,248; Optical focussing sensor, Lehureau; Jean-Claude, Paris, France, Bricot; Claude, Paris, France, Thomson-Brandt, Paris, France.

U.S. Pat. No. 4,672,188; Focus detector for optical apparatus, Cohen; Donald K., Tucson, Ariz., USA, International Business Machines Corporation, Armonk, N.Y., USA.

U.S. Pat. No. 4,684,799; Focus detection method involving cutting more than half of light beam reflected from disc, Emoto; Masami, Yokohama, Japan, Inuzuka; Hideo, Yokohama, Japan, Ricoh Company, Ltd., Tokyo, Japan.

The invention claimed is:

1. An arrangement for mitigating the effect of surface reflection in measuring the position of a focus in an optical measuring apparatus, wherein a measured object comprises a sample present in a sample vessel and for measuring the position of a focus, the measuring apparatus comprises:
a light source for applying a light beam to an object to be measured; and
a detector (770) for measuring light reflected from the measured object; whereby at least a portion of the light beam to be measured has reflected from a junction between the sample and a wall of said sample vessel, as well as a portion has possibly reflected from a junction between the wall and air,
characterized in that said arrangement comprises at least one polarization filter for filtering said light beam, and said sample vessel wall consists of a material, in which the polarization state of a light beam changes as the light beam advances through said wall, the polarization filter (721, 751) having its polarization direction selected in view of applying more suppression to the portion of a measured light beam reflected from the wall/air junction than to the portion reflected from the sample/wall junction.

2. An arrangement as set forth in claim 1, characterized in that it comprises a first polarization filter for filtering a light beam upstream of a measured object and a second polarization filter for filtering a reflected light beam prior to measuring the light beam.

3. An arrangement as set forth in claim 1, characterized in that a light beam is applied to said wall of the sample vessel at an inclined angle for providing polarization filtering as the light beam reflects from a junction between the sample vessel wall and air.

4. An arrangement as set forth in claim 1, characterized in that said wall of the sample vessel comprises a sample vessel bottom.

5. An arrangement as set forth in claim 1, characterized in that one sample vessel comprises a microtiter plate.

6. An arrangement as set forth in claim 1, characterized in that said sample comprises a biological or chemical sample.

7. An arrangement as set forth in claim 1 characterized in that said light source constitutes a coherent light source.

8. An arrangement as set forth in claim 1, characterized in that said measurement of a focus position is based on a knife edge method.

9. An arrangement as set forth in claim 1, characterized in that said measurement of position comprises an arrangement for focus detection comprising:

an objective lens for developing an image plane for an object to be measured;
a detector for measuring light received from the object; and
a mask interposed between the objective lens and the detector for making the space distribution of light received by the detectors surface dependent on a focus position; wherein
said mask is located essentially in a plane, in which the image plane is adapted to develop when the measuring apparatus is in focus; whereby
said detector is located behind said image plane.

10. An arrangement as set forth in claim 1, characterized in that said measuring apparatus comprises an optical microscope.

11. A method for decreasing adverse surface reflection in a measurement for the position of a focus in an optical measuring apparatus, the measurement comprising the following steps of:
supplying a light beam through a wall of a sample vessel containing a sample, to a junction between the sample and the wall;
measuring a light beam reflected from the sample, at least a portion of the light beam to be measured having reflected from the junction between the sample and the wall, as well as a portion having possibly reflected from a junction between the wall and air;
the method being characterized in that said light beam is filtered with at least one polarization filter and the light beam has its polarization state changed as the light beam travels through said wall, the polarization filter having its polarization direction selected in view of applying more suppression to the portion of the light beam reflected from the wall/air junction than to the portion reflected from the sample/wall junction.

12. A method as set forth in claim 11, characterized in that said light beam is filtered with a first polarization filter prior to said reflection of the light beam and the reflected light beam is filtered with a second polarization filter prior to measuring the light beam.

13. A method as set forth in claim 11, characterized in that the light beam is applied to the sample vessel wall at an inclined angle for effecting polarization filtering as the light beam reflects from a junction between the sample vessel wall and air.

14. A method as set forth in claim 11, characterized in that said sample comprises a biological or chemical sample.

15. A method as set forth in claim 11, characterized in that said light beam is coherent.

16. A method as set forth in claim 11, characterized in that the polarized light consists of linearly polarized and/or circularly polarized light.

17. A method as set forth in claim 11, characterized in that said determination of a focus position comprises using a knife edge method, in which the light beam is focused for establishing an image plane and the light beam is occluded for making the light beam's space distribution dependent on the position of the focus.

18. A method as set forth in claim 11, characterized in that said determination of the position of the focus is effected by using a method comprising the following steps:
supplying said light beam to an object to be measured;
using an objective lens to develop an image plane for said object to be measured;
occluding light reflected from said object for making the spatial distribution of light dependent on the focus position;

measuring the space distribution of the intensity of light reflected from the object;

wherein said occlusion is effected in a plane substantially perpendicular to the light beam, in which the image plane produced by the objective lens is adapted to develop when the optical measuring apparatus is in focus, the measurement of the space distribution of light intensity being performed from behind said image plane.

* * * * *